United States Patent Office 3,211,555
Patented Oct. 12, 1965

3,211,555
PHOTOGRAPHIC LAYERS FOR THE SILVER
DYESTUFF BLEACHING METHOD
Rudolf Mory, Dornach, and Helmut Boehl, Bottmingen, Switzerland, assignors to Ciba Limited, Basel, Switzerland, a company of Switzerland
No Drawing. Filed Dec. 20, 1961, Ser. No. 160,938
Claims priority, application Switzerland, Dec. 23, 1960, 14,395/60
12 Claims. (Cl. 96—99)

The silver dyestuff bleaching method for the production of color photographs is based on the fact that an azo-dyestuff of which a large number is suitable for the purpose, with which the layer-forming material, more especially gelatine, is dyed, is bleached in the layer to an extent that depends on the quantity of image silver locally present in the layer, by means of a suitable, so-called dyestuff bleaching bath. A reduction reaction takes place which is controlled by the image silver present and which leads to the destruction of the azo bridges.

Hitherto, the silver dyestuff bleaching method has been used almost exclusively with water-soluble azo-dyestuffs, because water-insoluble azo-pigments are generally not reduced or reduced very inadequately by the image silver present.

The present invention is based on the observation that certain azo-pigments do not exhibit this disadvantage and can therefore be used with advantage as dyestuffs for the silver dyestuff bleaching method.

Accordingly, the present invention provides photographic layers suitable for the silver dyestuff bleaching method, which contain at least one azo-pigment which contains at least one azo linkage bound on both sides to cyclic carbon atoms and contain a quinazoline or quinazolone-(4) radical in the radical of the diazo-component.

Being pigments, these dyestuffs must be free from groups imparting solubility in water such as carboxylic and sulfonic acid groups. They may contain more than one or a single azo linkage. This azo linkage is bound on both sides to cyclic carbon atoms which may belong to aromatic rings, more especially benzene or naphthalene rings, or to heterocyclic rings, such as pyrazolone rings. The dyestuff contains at least one quinazoline or quinazolone-(4) radical of the formula:

(1a)
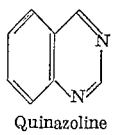
Quinazoline or (1b)
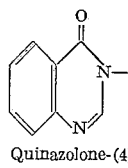
Quinazolone-(4)

Advantageously the quinazoline or quinazolone-(4) radical is bound to the rest of the molecule through a preferably basic nitrogen atom, for example, an —NH— group.

Such azo-pigments contain, for example, at least one radical of the formula:

(2)
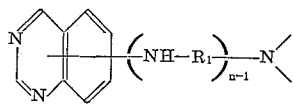

in which $R_1$ represents a benzene radical, and $n$ is 1 or 2, and the quinazoline ring may contain further substituents.

The terminal nitrogen atom in the Formula 2 may be for example, one of the two nitrogen atoms of an azo linkage, as in the case of the dyestuffs of the formula:

(3)
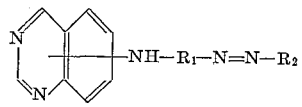

in which $R_1$ is a benzene radical, and $R_2$ is the radical of a coupling component, for example, the radical of a 2-hydroxy-naphthalene-3-carboxylic acid arylamide bound in the 1-position to the azo linkage, or the radical of a 5-pyrazolone or 5-iminopyrazoline bound in the 4-position to the azo linkage.

The azo-pigments containing quinazoline or quinazolone-(4) radicals can be made by methods in themselves known. Thus, pigments of the Formula 3 can be made by coupling a diazo-compound of an amine of the formula:

(4)
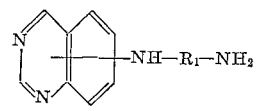

in which $R_1$ is a benzene radical, with a coupling component, preferably a 2-hydroxynaphthalene-3-carboxylic acid arylamide or a pyrazolone.

The diazo-components of the Formula 4 used as starting materials can also be made by methods in themselves known. Thus amines of the formula:

(5)
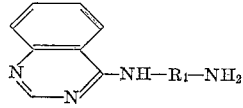

in which $R_1$ has the above meaning, are obtained, for example, by condensing 4-chloroquinazoline with a monoaminobenzene, nitrating the resulting 4-phenylaminoquinazoline (whose phenyl radical may be further substituted), and reducing the 4-(nitrophenylamino)-quinazoline so obtained.

Another process for making the compounds of the Formula 5 consists in condensing 4-chloroquinazoline with an amino-acetylaminobenzene (which may contain further substituents) and splitting off the acetyl group from the resulting 4-(acetyl-aminophenylamino)-quinazoline. The above compounds can also be made by condensing an aminonitrobenzene (which may be further substituted) with chloroquinazoline, followed by reduction of the nitro group to the amino group.

As further substituents which may be present in the aminobenzenes or amino-acetylaminobenzenes used as starting materials there may be mentioned halogen atoms, more especially chlorine, lower alkyl groups, such as methyl or ethyl, and lower alkoxy groups such as methoxy and ethoxy.

As diazo-components further suitable for the manufacture of valuable pigments there may be mentioned the compounds of the following formulae:

(6)
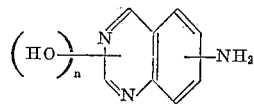

(7)
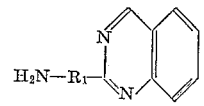

(8) 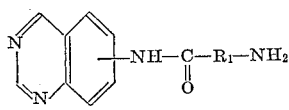

(9) 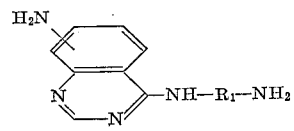

(10) 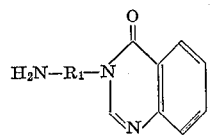

in which formulae $R_1$ represents a benzene radial, and $n$ is 1 or 2.

When the coupling component used in the manufacture of the azo-pigment is a 2-hydroxynaphthalene-3-carboxylic acid arylamide, the arylamide radical may be of the naphthalene series or advantageously of the benzene series. The benzene radical may contain further substituents, for example, halogen atoms such as chlorine, or lower alkyl groups such as methyl or ethyl, and/or lower alkoxy groups, such as methoxy or ethoxy.

When the coupling component used is a pyrazolone, it is of advantage to use a 1-phenyl-3-methyl-5-pyrazolone, of which the phenyl radical may contain substituents.

As in the case of the intermediate products used as diazo and coupling components, the azo-pigments may be made therefrom by methods in themselves known. Having regard to the pigment character of the products it is in some cases advantageous to incorporate in the coupling mixture a wetting or dispersing agent and/or an organic solvent, such as dimethyl formamide.

For the manufacture of photographic layers suitable for the silver dyestuff bleaching method the dyestuffs must be incorporated in a suitable layer-forming material, preferably gelatine, uniformly and in a finely dispersed condition, advantageously having a particle size of less than $0.5\mu$. This can be achieved in a variety of ways, namely:

(a) A solution of the pigment in a water-miscible solvent, such as formic acid, dimethyl-formamide, dimethyl sulfoxide or tetrahydrofurane, is mixed with a gelatin solution, if necessary, with the addition of a wetting or dispersing agent.

(b) The coupling of the diazo-compound with the coupling component to form the azo-pigment is carried out in a gelatine solution.

(c) The pigment is brought into the desired state of fine dispersion by grinding it in a suitable known apparatus, advantageously in the presence of water and of a wetting or dispersing agent, and then mixed with a gelatine solution.

(d) A water-soluble derivative of the pigment, which is capable of being split up to yield the pigment, is split up within the gelatine solution. For this purpose there are particularly suitable acyl-derivatives of the pigments containing acyl groups having water-solubilizing substituents, preferably sulfonic acid groups. Such acyl-derivatives can be prepared in known manner especially from pigments containing the radical of a 2-hydroxy-naphthalene-3-carboxylic acid arylamide and a suitable acylating agent, such as a benzene carboxylic acid sulfonyl chloride or benzene sulfonic acid carboxylic acid chloride.

The azo-pigments having the constitution defined above possess surprisingly advantageous properties for use as layer dyestuffs. As mentioned above they can be bleached out well in the dyed layers by the usual methods of carrying out the silver dyestuff bleaching process. By suitable methods, for example, those described above under (a) to (d), they can easily be brought into the desired state of fine dispersion in the layers, and the requisite transparency thus achieved. In general, the dyestuffs are very fast to diffusion without the need to add special diffusion inhibitors.

Finally, the pigments used in accordance with the invention have the further advantage that they produce substantially no desensitization of the light sensitive substances.

The following examples illustrate the invention, the parts and percentages being by weight unless otherwise stated, and the relationship of parts by weight to parts by volume being the same as that of the kilogram to the liter:

*Example 1*

A mixture of 0.64 part of the dyestuff pigment of the formula

(11) 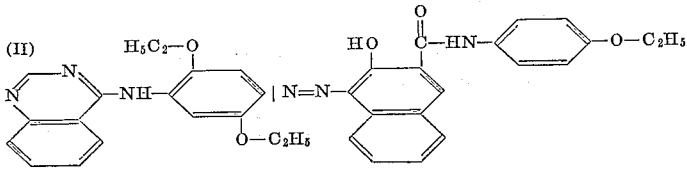

0.32 part of saponin and 20 parts of water is ground in an efficient ball mill, which contains no metal parts, for example, in a laboratory model attritor mill, until substantially all the dyestuff particles have a size smaller than $0.5\mu$. The contents of the mill are then flushed out with 80 parts of water and intimately mixed with 320 parts of a gelatine solution of 6.25% strength. The pigmented gelatine is blue and highly transparent. 100 parts of this dyed gelatine are mixed with 200 parts of a silver bromide emulsion sensitized to red, and the mixture is cast on glass plates. The plates are exposed under a wedge, and the silver image is developed in a metol-hydroquinone developer and fixed. The dyestuff is then bleached out locally in accordance with the amount of silver present in a bath containing, per 1000 parts by volume, 30 to 100 parts by volume of hydrochloric acid of 37% strength, 40 to 120 parts of potassium bromide, 30 to 50 parts of thiourea and 0.001 to 0.01 part of aminohydroxyphenazine. The excess of silver is then removed in a bath containing, per 1000 parts by volume, 100 parts of sodium chloride, 100 parts of crystalline copper sulfate and 50 parts by volume of hydrochloric acid of 37% strength. Finally, the plates are fixed in usual manner. In this manner a blue colored wedge is obtained which is the reverse of the original silver wedge, the areas in which the density of silver was originally greatest are pure white.

The dyestuff of the Formula 11 can be prepared as follows:

6.9 parts of 4-(4'-amino-2':5'-diethoxyphenylamino)-quinazoline and 7 parts by volume of hydrochloric acid (specific gravity=1.195) are dissolved in 100 parts of water and diazotized at 0 to 5° C. with 5 parts by volume of a 4 N-sodium nitrite solution. In the course of about 20 minutes the diazo-solution is mixed with a mixture of 6.2 parts of 2-hydroxynaphthalene-3-carboxylic acid 4'-ethoxyphenylamide, 10 parts of anhydrous sodium carbonate and 100 parts by volume of dimethyl-formamide. After stirring the mixture for several hours at room temperature, the dyestuff formed is filtered off, washed with water and with ethanol, and dried. There are obtained about 8.65 parts of the dyestuff. By recrystallization from ortho-dichlorobenzene the dyestuff is obtained in an analytically pure form as fine prismatic needles.

Analysis ($C_{37}H_{34}N_6O_5$): Calculated: C, 69.14%; H, 5.33%; N, 13.08%. Found: C, 69.12%; H, 5.31%; N, 13.20%.

The quinazoline compound used as starting material can be prepared in the following manner:

A mixture of 87.6 parts of 4-hydroxyquinazoline, 600 parts by volume of ortho-dichlorobenzene and 125 parts of phosphorus pentachloride is heated for 20 minutes at 185° C., and 150 parts by volume of liquid are then distilled from the reaction mixture. To the cooled solution of 4-chloroquinazoline are then added 108.6 parts of 2:5-diethoxy-1-aminobenzene. The mixture is heated for 2 hours at 150° C., and then freed from ortho-dichlorobenzene by steam distillation. The resulting 4-(2':5'-diethoxyphenylamino)-quinazoline is precipitated with sodium carbonate from the residual aqueous mixture. It is purified by recrystallization from a mixture of ethanol and water (1:1), and is a grey-green powder melting at 104–106° C.

In the course of 15 minutes a mixture of 35.7 parts by volume of nitric acid (specific gravity $d_{15}=1.405$) and 50 parts by volume of glacial acetic acid is added to a solution of 82 parts of 4-(2':5'-diethoxyphenylamino)-quinazoline in 500 parts by volume of glacial acetic acid. The mixture is then heated in a bath for ½ hour at 35–40° C. and allowed to cool overnight, during which the nitro-compound separates out in crystalline form. It is filtered off, washed in turn with cold glacial acetic acid, water and dilute ammonia solution and dried.

After recrystallization from glacial acetic acid it is a dull yellow powder melting at 209–212° C.

114 parts of 4-(4'-nitro-2':5'-diethoxyphenylamino)-quinazoline are reduced in 900 parts by volume of dimethyl formamide under atmospheric pressure in a shaking flask and in the presence of Raney nickel at 20 to 50° C. After being freed from nickel the dimethyl-formamide solution is diluted with cold water to precipitate the 4-(4'-amino-2':5'-diethoxyphenylamino)-quinazoline. It can be purified by recrystallization from benzene, and is a light green powder melting at 133–136° C.

Alternatively, the above product can be prepared by condensing 4-chloroquinazoline with 4-acetylamino-2:5-diethoxy-1-aminobenzene and subequent by splitting off the acetyl group with an aqueous methanolic solution of potassium hydroxide.

*Example 2*

When the procedure described in Example 1 is carried out with the dyestuff obtained as described below, a red colored wedge is obtained.

As described in Example 1, 5 parts of 4-(5'-amino-2'-methylphenylamino)-quinazoline are diazotized and coupled with 5.54 parts of 2-hydroxynaphthalene-5-carboxylic acid 4'-methylphenylamide. In substance the dyestuff is a dull red powder.

The diazo-component used above as starting material can be prepared in the following manner:

A solution of 4-chloroquinazoline prepared as described in Example 1 is mixed with 91.2 parts of 1-amino-2-methyl-5-nitrobenzene, and the condensation is completed by heating the mixture for 2½ hours at 140° C. After cooling the mixture the nitro-compound is filtered off, freed from residual ortho-dichlorobenzene with steam, subjected to an alkaline after-treatment, and dried. It is a beige colored powder and melts at 210–215° C. By catalytic reduction with Raney nickel it yields 4-(5'-amino-2'-methylphenylamino)-quinazoline as a beige colored powder melting at 174–178° C.

In the following table are given various other dyestuffs of this type which are suitable for use as described in Example 1 and can be prepared in the above manner. In column I are given the diazo-components and their melting points, in column II the coupling components, in column III the colors of solutions of the dyestuffs in concentrated sulfuric acid, and in column IV the colors of solutions of the dyestuffs in hot dimethylformamide.

| No. | I Diazo-components (melting points) | II Coupling components | III Conc. sulfuric acid | IV Dimethylformamide |
|---|---|---|---|---|
| 1 | 4-(4'-amino-2':5'-diethoxyphenylamino)-quinazoline (133 to 136° C.). | 2-hydroxynaphthalene-3-carboxylic acid-2'-methylphenylamide. | Blue | Violet. |
| 2 | ----do---- | 2-hydroxynaphthalene-3-carboxylic acid-4'-methoxyphenylamide. | ----do---- | Do. |
| 3 | 4-(4'-amino-2'-methoxyphenylamino)-quinazoline (161 to 163° C.). | 2-hydroxynaphthalene-3-carboxylic acid-2'-methoxyphenylamide. | Purple | Purple. |
| 4 | ----do---- | 2-hydroxynaphthalene-3-carboxylic acid-2':4'-dimethoxy-5'-chlorophenylamide. | ----do---- | Do. |
| 5 | 4-(4'-aminophenylamino)-quinazoline (213 to 215° C.). | ----do---- | Blue-red | Blue-red. |
| 6 | 4-(3'-aminophenylamino)-quinazoline (242–245° C.) | 1-phenyl-3-methylpyrazolone-(5) | Yellow | Green-yellow. |
| 7 | 4-(5'-amino-2'-methylphenylamino)-quinazoline (174 to 178° C.). | 2-hydroxynaphthalene carboxylic acid-4'-chlorophenylamide. | Blue-red | Scarlet. |
| 8 | ----do---- | 2-hydroxynaphthalene-3-carboxylic acid-3'-nitrophenylamide. | ----do---- | Do. |
| 9 | 4-(4'-amino-2':5'-dimethoxyphenylamino)-quinazoline (98 to 100° C.). | 2-hydroxynaphthalene-3-carboxylic acid-4'-ethoxyphenylamide. | Blue | Violet. |
| 10 | ----do---- | 2-hydroxynaphthalene-3-carboxylic acid-2'-methoxyphenylamide. | ----do---- | Do. |
| 11 | ----do---- | 2-hydroxynaphthalene-3-carboxylic acid-2'-methoxy-5'-chlorophenylamide. | ----do---- | Do. |
| 12 | ----do---- | 2-hydroxynaphthalene-3-carboxylic acid-2':5'-dimethoxy-4'-chlorophenylamide. | ----do---- | Do. |
| 13 | ----do---- | 2-hydroxynaphthalene-3-carboxylic acid-2':4'-dimethoxy-5'-chlorophenylamide. | ----do---- | Do. |
| 14 | ----do---- | 2-hydroxynaphthalene-3-carboxylic acid-2'-methyl-4'-chlorophenylamide. | ----do---- | Do. |
| 15 | 4-(4'-amino-2'-methoxy-5'-methylphenylamino)-quinazoline (181 to 184° C.). | 2-hydroxynaphthalene-3-carboxylic acid-2'-methoxy-phenylamide. | Red-violet | Red-violet. |
| 16 | ----do---- | 2-hydroxynaphthalene-3-carboxylic acid α-naphthylamide. | ----do---- | Do. |
| 17 | ----do---- | 2-hydroxynaphthalene-3-carboxylic acid 4'-chlorophenylamide. | ----do---- | Do. |

| No. | I | II | III | IV |
|---|---|---|---|---|
| | | | \multicolumn{2}{c}{Color of solution in—} | |
| | Diazo-components (melting points) | Coupling components | Conc. sulfuric acid | Dimethyl-formamide |
| 18 | _____do_____ | 2-hydroxynaphthalene-3-carboxylic acid 2'-methyl-4'-chlorophenylamide. | _____do_____ | Violet. |
| 19 | _____do_____ | 2-hydroxynaphthalene-3-carboxylic acid 2':4'-dimethoxy-5-'chlorophenylamide. | _____do_____ | Red-violet. |
| 20 | 4-(4'-amino-2'-methoxy-5'-chlorophenylamino)-quinazoline (210 to 212° C.). | 2-hydroxynaphthalene-3-carboxylic acid 2'-methoxy-phenylamide. | Violet | Do. |
| 21 | _____do_____ | 2-hydroxynaphthalene-3-carboxylic acid β-naphthylamide. | _____do_____ | Do. |
| 22 | _____do_____ | 2-hydroxynaphthalene-3-carboxylic acid 2'-ethoxyphenylamide. | _____do_____ | Do. |
| 23 | _____do_____ | 2-hydroxy-6-bromonaphthalene-3-carboxylic acid 2'-methoxyphenylamide. | _____do_____ | Violet. |
| 24 | 4-(4'-amino-2'-methyl-5'-methoxyphenylamino)-quinazoline (192 to 194° C.). | 2-hydroxynaphthalene-3-carboxylic acid 2-'methoxyphenylamide. | _____do_____ | Red-violet. |
| 25 | _____do_____ | 2-hyroxynaphthalene-3-carboxylic acid β-naphthylamide. | _____do_____ | Do. |
| 26 | _____do_____ | 2-hydroxynaphthalene-3-carboxylic acid 2'-ethoxyphenylamide. | _____do_____ | Do. |
| 27 | _____do_____ | 2-hydroxynaphthalene-3-carboxylic acid 2':4'-dimethoxy-5'-chlorophenylamide. | _____do_____ | Do. |
| 28 | 4-hydroxy-7-aminoquinazoline (293 to 295° C.). | 2-hydroxynaphthalene-3-carboxylic acid β-naphthylamide. | Blue-red | Yellow-red. |
| 29 | 4-(4'-aminophenylamino)-quinazoline (213 to 215° C.). | 1-phenyl-3-methyl-pyrazolone-(5) | Yellow | Yellow. |
| 30 | 4-hydroxy-7-aminoquinoxaline (293 to 295° C.). | _____do_____ | Green-yellow | Do. |

Example 3

1 part of the dyestuff pigment obtained by coupling diazotized 6-(4'-aminobenzoylamino)-4-hydroxyquinazoline with 3-methylpyrazolone-(5) is mixed with 1 part of sodium diisobutyl-naphthalene sulfonate and 20 parts of water, and the mixture is ground in a metal-free ball mill until substantially all particles have been reduced to a size below $0.5\mu$. The ground product is then taken up in a gelatine solution in such manner that a dyed gelatine is obtained having a content of 6% of dry gelatine, 0.5% of dyestuff and 0.5% of a dispersing agent.

150 parts of the dyed gelatine are mixed with 150 parts of a silver bromide emulsion, and the mixture is cast on a film in the usual manner. By exposing the film under a wedge, developing, fixing, bleaching out the dyestuff, bleaching out the silver and fixing, as described in Example 1, a clear yellow colored wedge is obtained which is the reverse of the silver image and has a very good fastness to light.

The diazo-component used in this example can be prepared by acylating 6-amino-4-hydroxyquinazoline with para-nitrobenzoyl chloride and subsequent catalytic reduction of the nitro group with hydrogen. The base melts at 309–311° C.

In the following table are given further examples of azo-pigments containing a quinazoline or quinazolone radical, which are suitable for the manufacture of yellow layers for the silver dyestuff bleaching process. In column I are given the diazo-components and their melting points, in column II the coupling components, and column III the tints of gelatine layers pigmented with the dyestuff.

| No. | I | II | III |
|---|---|---|---|
| 1 | 2:4-dihydroxy-7-amino-quinazoline (M.P. >320° C.). | 1-phenyl-3-methylpyrazolone-(5)-2'-methyl-sulfone. | Green-yellow. |
| 2 | _____do_____ | 1-phenyl-3-methylpyrazolone-(5)-3'-sulfonic acid methylamide. | Do. |
| 3 | _____do_____ | 1-(4'-methylphenyl)-3-methyl-5-imino-pyrazoline. | Golden yellow. |
| 4 | _____do_____ | 3-methylpyrazolone-(5) | Do. |
| 5 | 4-dyhroxy-7-aminoquinazoline (M.P. 293-295° C.). | 1-phenyl-3-methylpyrazolone-(5)-4'-methyl-sulfone. | Green-yellow. |
| 6 | _____do_____ | 1-phenyl-3-methylpyrazolone-(5)-3'-sulfonic acid methylamide. | Yellow. |
| 7 | _____do_____ | 3-methyl-pyrazolone-(5) | Do. |
| 8 | 4-dyhroxy-2-(4'-aminophenyl)-quinazoline (M.P. 277-279° C.). | _____do_____ | Golden yellow. |
| 9 | 2-methyl-3-(4'-aminophenyl)-quinazolone-(4) (M.P. 220-223° C.). | 1-phenyl-3-methylpyrazolone-(5) | Yellow. |
| 10 | _____do_____ | 1-(4'-chlorophenyl)-3-methylpyrazolone-(5). | Golden yellow. |
| 11 | 4-hydroxy-6-aminoquinazoline (M.P. 295-300° C.). | 1-phenyl-3-methylpyrazolon-(5) | Yellow. |
| 12 | 6-(4'-aminobenzoylamino)-4-hydroxyquinazoline (M.P. 309-311° C.). | 1-phenyl-3-methylpyrazolone-(5)-4'-methylsulfone. | Green-yellow. |
| 13 | _____do_____ | 1-phenyl-3-methylpyrazolone-(5)-3'-sulfonic acid-methylamide. | Do. |
| 14 | 4-(4'-aminophenylamino)-6-aminoquinazoline (M.P. abt. 260° C.). | 3-methylpyrazolone-(5) (2 molec. proportions). | Orange. |
| 15 | 2-methyl-3-(4''-aminodiphenyl-1'':1'-yl-4')-quinazolone-(4) (M.P. 284-288° C.). | 1-(2'-chlorophenyl)-3-methylpyrazolone-(5)-5'-sulfonamide. | Golden yellow. |

What is claimed is:

1. A photographic layer for the silver dyestuffs bleaching process which contains silver halide and at least one azo-pigment containing one azo linkage, the latter being bound on both sides to cyclic carbon atoms, containing a member selected from the group consisting of a quinazoline radical and a quinazolone-(4) radical as the radical of the diazo component, and containing a member selected from the group of a 2-hydroxynaphthalene-3-carboxylic acid arylamide radical bound in its 1-position to the azo linkage, a 5-pyrazolone radical bound in its 4-position to the azo linkage, and a 5-iminopyrazoline radical bound in its 4-position to the azo linkage as the radical of the coupling component.

2. A photographic layer for the silver dyestuff bleaching process which contains silver halide and at least one azo-pigment of the formula

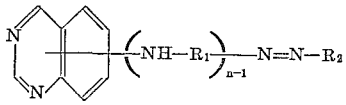

in which $R_1$ represents a benzene radical, $n$ represents a whole number of at the most 2, and $R_2$ represents the radical of a 2-hydroxynaphthalene-3-carboxylic acid arylamide bound in its 1-position to the azo linkage.

3. A photographic layer for the silver dyestuff bleaching process which contains silver halide and at least one azo-pigment of the formula

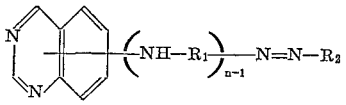

in which $R_1$ represents a benzene radical, $n$ represents a whole number of at the most 2, and $R_2$ represents the radical of a 5-pyrazolone bound in its 4-position to the azo linkage.

4. A photographic layer for the silver dyestuff bleaching process which contains silver halide and at least one azo-pigment of the formula

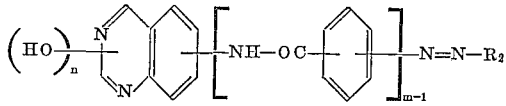

in which $m$ and $n$ each represents a whole number of at the most 2 and $R_2$ represents the radical of a 5-pyrazolone bound in its 4-position to the azo linkage.

5. A photographic layer for the silver dyestuff bleaching process which contains silver halide and at least one azo-pigment of the formula

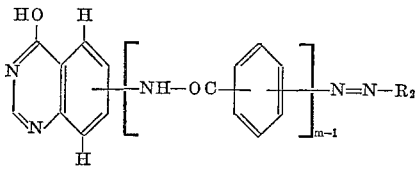

in which $m$ represents a whole number of at the most 2 and $R_2$ represents the radical of a 5-pyrazolone bound in its 4-position to the azo linkage.

6. A photographic layer for the silver dyestuff bleaching process which contains silver halide and at least one azo-pigment of the formula

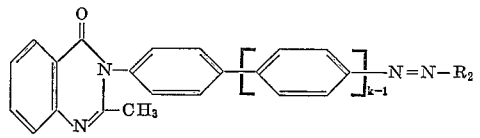

in which $R_2$ represents the radial of a 5-pyrazolone bound in its 4-position to the azo linkage and $k$ represents a whole number of at the most 2.

7. A photographic layer for the silver dyestuff bleaching process which contains silver halide and the azo-pigment of the formula

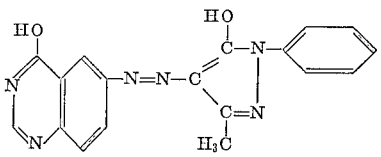

8. A photographic layer for the silver dyestuff bleaching process which contains silver halide and the azo-pigment of the formula

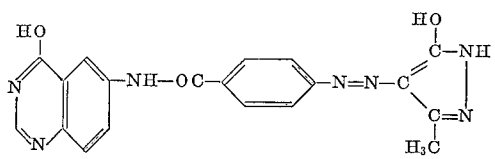

9. A photographic layer for the silver dyestuff bleaching process which contains silver halide and the azo-pigment of the formula

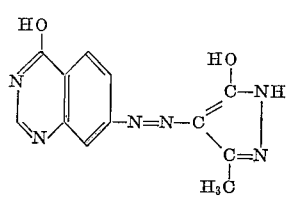

10. A photographic layer for the silver dyestuff bleaching process which contains silver halide and the azo-pigment of the formula

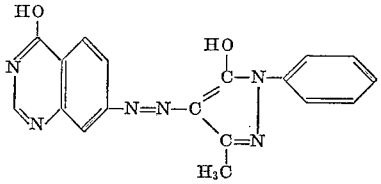

11. A photographic layer for the silver dyestuff bleaching process which contains silver halide and the azo-pigment of the formula

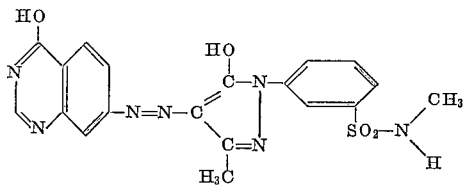

12. A photographic layer for the silver dyestuff bleaching process which contains silver halide and the azo-pigment of the formula

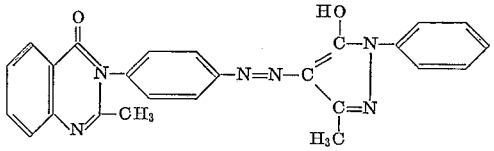

References Cited by the Examiner

UNITED STATES PATENTS 3,053,655  9/62  Dreyfuss et al. _____ 96—99
3,154,532  10/64  Weidinger et al. _____ 8—41 X

FOREIGN PATENTS 602,170  5/48  Great Britain.

NORMAN G. TORCHIN, *Primary Examiner.*

LOUISE P. QUAST *Examiner.*